United States Patent [19]

Ostertag et al.

[11] Patent Number: 4,736,772

[45] Date of Patent: Apr. 12, 1988

[54] SANITARY VALVE

[76] Inventors: Ulrich K. Ostertag, Eibenweg 6; Reinhard F. Ostertag, Felix-Dahn-Str. 80, both of 7000 Stuttgart 70, Fed. Rep. of Germany

[21] Appl. No.: 86,541

[22] Filed: Aug. 18, 1987

[30] Foreign Application Priority Data

Aug. 30, 1986 [DE] Fed. Rep. of Germany ....... 3629569

[51] Int. Cl.$^4$ .................. F16K 11/078; F16K 31/48
[52] U.S. Cl. .......................... 137/625.17; 137/625.4; 251/54; 267/137; 267/140.1
[58] Field of Search .............. 137/597, 625.17, 625.4, 137/625.48, 454.2, 454.6, 636, 636.1; 251/48, 54; 267/137, 140.1

[56] References Cited

U.S. PATENT DOCUMENTS

| | | | |
|---|---|---|---|
| 1,589,640 | 6/1926 | Gulick | 251/54 |
| 3,102,711 | 9/1963 | Filliung | 251/54 |
| 3,211,416 | 10/1965 | Billeter et al. | 251/54 |
| 3,533,444 | 10/1970 | Lyon | 137/625.17 |
| 3,736,959 | 6/1973 | Parkison | 137/454.6 |
| 3,893,482 | 7/1975 | Loose | 137/625.17 |
| 3,965,936 | 6/1976 | Lyon | 137/625.17 |
| 4,458,888 | 7/1984 | Wolf et al. | 267/140.1 |
| 4,676,489 | 6/1987 | Hoffmann et al. | 267/140.1 |

FOREIGN PATENT DOCUMENTS

| | | | |
|---|---|---|---|
| 3246350 | 6/1984 | Fed. Rep. of Germany | 137/625.17 UX |
| 3524149 | 1/1987 | Fed. Rep. of Germany | 137/625.17 |
| 3534692 | 4/1987 | Fed. Rep. of Germany | 137/625.17 UX |

Primary Examiner—George L. Walton
Attorney, Agent, or Firm—Fred Philpitt

[57] ABSTRACT

In a sanitary valve with a tilting adjusting lever, which moves the closure member, the two wedge-shaped areas, which open and close in opposite directions on opposite sides of the adjusting lever, as it tilts, are used for locating a damping device, which retards the closing movement of the closure member in order to avoid water hammering. For this purpose, a liquid-filled chamber of variable volume is located in each of the two wedge-shaped areas; the two chambers are connected to each other by a restrictor channel. The damping device located in this way, which can be enclosed hermetically, necessitates no alterations to the valve itself.

12 Claims, 2 Drawing Sheets

SANITARY VALVE

DESCRIPTION

The invention relates to a sanitary valve with a housing, with an adjusting lever which is mounted to tilt, by which a closure member can be moved in order to vary the quantity of water flowing out, in which case two wedge-shaped areas are formed between two sides of the adjusting lever located opposite each other in the tilting direction and an adjacent part, which areas open and close in opposite directions at the time of tilting of the adjusting lever; with a damping device, which retards an excessively rapid movement of the closure member at least in the closing direction.

A sanitary valve of this type is known from German OS No. 32 46 350. In this case, high pressure surges in the pipe system, which could be caused by sudden closure of the sanitary valve, are prevented by a movement brake, which is connected to a movable control disc serving as the closure member. This movement brake consists of a piston, which is connected to the movable control disc by way of a piston rod and moves to and fro in a water-filled cylinder. The cylinder itself is located in the fitting body; it is filled by way of a connection to the water outlet of the fitting. In this known sanitary valve it is a drawback that the movement brake is difficult to locate as regards space and causes high costs both as regards production and assembly. The commercially available valves and the fitting housings, together with which the valves are to be used, must be designed afresh, in order that the teaching given in German OS No. 32 46 350 can be followed.

For the above-given reasons it was already proposed in the prior patent application No. P 35 24 149.7 to locate the movable control disc itself in a substantially closed chamber, which is filled with a fluid medium and thus to use it simultaneously as the piston of the movement brake. However, this design pre-supposes that it is possible to create a closed chamber in which the movable control disc moves.

In prior Patent Application No. P 35 34 692.2, it is proposed to locate the cylinder bore of the movement brake constructed as a damping piston in the movable control disc itself and to construct the damping piston as a ram, which encounters a stationary part at the time of movement of the control disc. However, this method of construction also requires a special construction of certain parts of the sanitary valve itself.

It is the object of the present invention to provide a sanitary valve of the afore-mentioned type with a damping device, without the structural components themselves having to be altered in this case.

This object is achieved according to the invention due to the fact that the damping device comprises two chambers of variable volume filled with a liquid, which chambers are arranged in the two wedge-shaped areas and are connected by at least one restrictor channel, which is guided past the adjusting lever.

Thus, according to the invention two areas are used for locating the damping device which were indeed present in the known valve, but not used in any way. The two chambers of the damping device are located in these areas, which change their volume in opposite directions at the time of tilting of the adjusting lever, between which chambers liquid is moved to and fro by way of the restrictor channel, which is guided past the adjusting lever. The damping device may thus be designed so that it can be incorporated in known valves easily possibly even subsequently.

Appropriately the damping device comprises a central part, which connects the two chambers to each other and contains a window, which receives the adjusting lever. In this case it is recommended to guide the restrictor channel through the central part past the side of the window. In this way the restrictor channel is located in an orderly manner; there is no need to fear kinking or the like, as would be conceivable in the case of a restrictor channel constructed as a hose.

If a slot is provided on the side of the central part remote from the restrictor channel, which extends from the window towards the outer side of the central part, the entire damping device may easily be connected laterally to the adjusting lever.

A particular embodiment of the invention consists in that the central part extends assymmetrically in the direction of one chamber in a solid manner into a region which is deformed at the time of tilting of the adjusting lever. It is thus achieved that at the time of reducing the corresponding chamber, the restictor channel is "squeezed" due to which its cross section is reduced and the damping action is increased with increasing closure of the sanitary valve. This is a desirable effect, since generally the action of the movement brake is required solely in the very last closing stage.

If the restrictor channel has a variable cross section in the assymmetrically extended region of the central part, the force-displacement characteristic of the damping device can be custom tailored.

Generally it is sufficient and appropriate if the restrictor channel has the shape of a funnel in the assymmetrically extended portion of the central part.

It is recommended that the damping device is produced in one piece from flexible and/or resilient material. The two liquid-filled chambers are then sealed hermetically and connected to each other by way of the central part. The damping device may thus be produced economically in large quantities and assembled easily.

The useful life of the damping device is extended due to the fact that it comprises reinforcements on the outer surfaces which are subject to stress during tilting of the adjusting lever.

According to two known designs of the volume stop in sanitary mixing valves, the following two alternatives are offered in particular for locating the chambers of the damping device:

On the one hand the chambers of the damping device may be located between two opposing shoulders of the adjusting lever and the upper front end of the part in which the adjusting lever is mounted.

On the other hand one design is particularly advantageous in which the chambers of the damping device are arranged between two opposing surfaces of the adjusting lever and two inclined surfaces of a bore, through which the adjusting lever passes.

Embodiments of the invention are described in detail hereafter with reference to the drawings, in which:

FIG. 1 shows a first embodiment of a sanitary mixing valve, which is constructed in the manner of a cartridge: this means that the mixing valve can be fitted as a standard component in an outer fitting body which is not shown.

Figure 1:
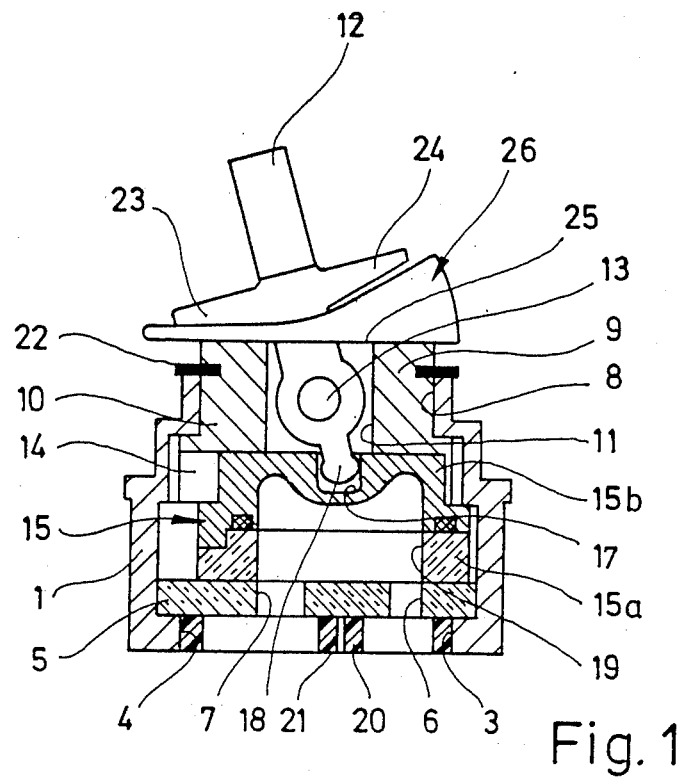
FIG. 1 is an axial section through a first embodiment of a sanitary single-lever mixer.

Three openings are provided in the base of the cup-shaped housing 1: two inlet openings 3 for cold or mixed water (only one can be seen in the drawing) and an outlet opening 4 for mixed water. The geometry and arrangement of these openings is known as such and therefore does not need to be described in detail.

Located on the base of the housing 1 is a first control disc 5 of ceramic material or another hard substance, whereof the upwardly directed surface is finely polished or lapped in known manner. It is prevented from rotating in the housing 1 by suitable positive engagement. The stationary control disc 5 in turn contains three openings, which communicate with the openings 3,4 of the housing 1: respectively an opening 6 for cold and hot water and an opening 7 for returning mixed water.

The penetration of water between the stationary control disc 5 and housing 1 is prevented by elastic washers 20,21, which are introduced from below into the openings 3,4 of the housing 1 and exert an upwardly directed pressure on the stationary control disc 5. The same washers may be used for sealing the inserted cartridge against the outer fitting body which is not shown.

Mounted to rotate in a central, upper opening 8 of the housing 1 is the cylindrical neck 9 of a substantially rotationally symmetrical entrainment member 10, which is fixed axially by a circlip 22. Passing through the neck 9 is a central opening 11, which receives an adjusting lever 12. The adjusting lever 12 is pivoted in the upper region of the neck 9 by means of a pivot pin 13.

Located in the lower surface of the entrainment part 10 is a relatively wide and deep groove, so that two parallel opposing guide surfaces 14 are formed. A second movable control disc 15 is seated in a positive manner in this groove, this control disc being composed of an upper synthetic part 15a and a lower ceramic part 15b in a form-locking and tight manner.

The movable control disc 15 in turn comprises two parallel, opposing guide surfaces, which cooperate with the guide surfaces 14 of the entrainment member 10. In this way the movable control disc 15 is guided in the entrainment member 10 precisely in a translatory manner, radially with respect to the axis of the cartridge.

The movable control disc 15 also comprises in its upper surface a preferably cylindrical recess 17, in which a head 18 at the lower end of the adjusting lever 12 engages.

A regulating recess 19 which is open towards the stationary control disc 5 is constructed in known manner in the movable control disc 15. Depending on the relative position of the two control discs 5, 15, a connection between one or both openings 6 and the opening 7 in the stationary control disc 5 is produced by way of the regulating recess 19.

The tilting region of the adjusting lever 12 about the pivot pin 13 is limited by two opposing, wing-like shoulders 23,24 of the adjusting lever 12. In known mixer valves of this construction, the shoulders 23, 24 cooperate with the upper end face 25 of the neck 9 of the entrainment member 10. Wedge-shaped areas are produced between the shoulders 23,24 and the upper end face 25 of the neck 9, which areas open and close in opposite directions as the adjusting lever 12 tilts.

Figure 3:
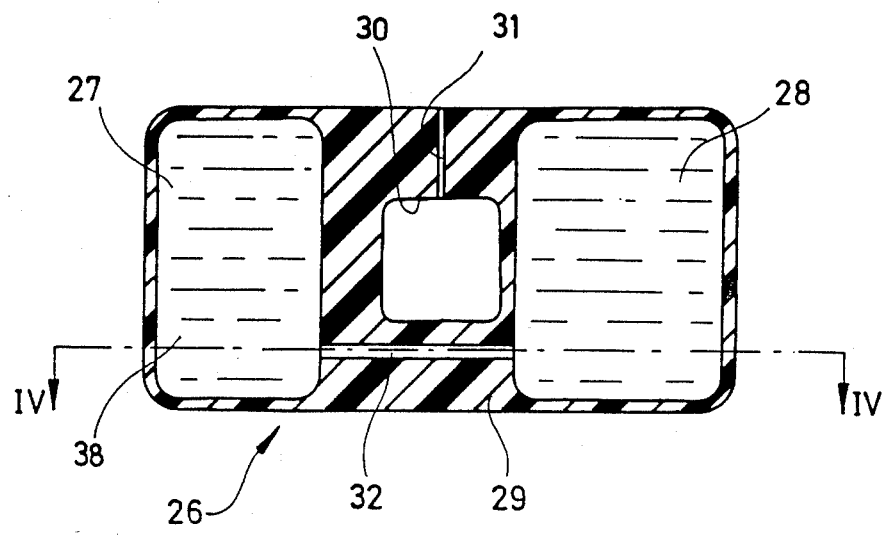
FIG. 3 is a section through a damping device on line III—III of FIG. 4.
Figure 4:
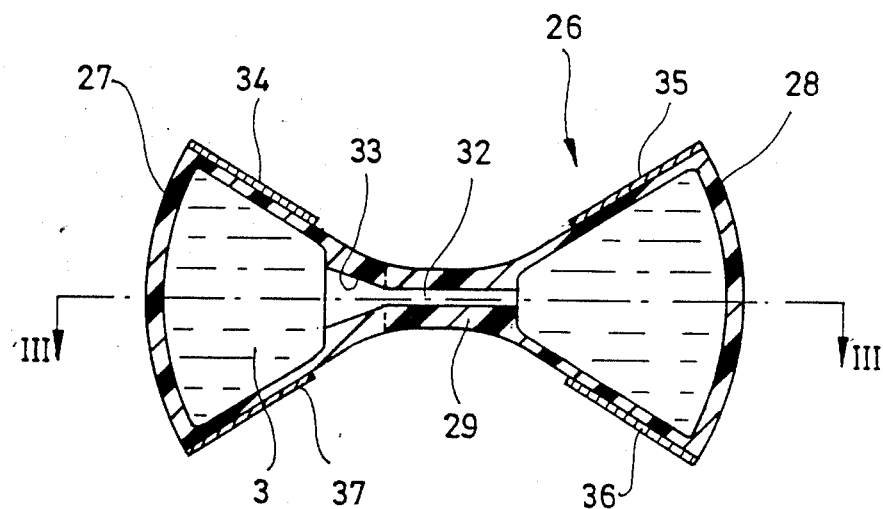
FIG. 4 is a section through the damping device of FIG. 3 on line IV—IV.

In the mixer valve illustrated, a damping device is located in these wedge-shaped areas, which damping device is provided generally with the reference numeral 26 and in FIGS. 3 and 4 is shown detached and to a larger scale.

The damping device 26 is made from resilient, but at least flexible material, for example of rubber. It comprises two opposing, wedge-shaped hollow chambers 27, 28, which are connected to each other by a substantially solid central part 29. Provided in the central part 29 is a window 30 (FIG. 3), into which the adjusting lever 12 can be introduced by way of a slot 31 open towards the side.

The two chambers 27 and 28 are connected to each other by a restrictor channel 32, which extends through the central part 29 of the damping device 26 on the opposite side to the slot 31.

FIGS. 3 and 4 show that the damping device 26 is constructed asymmetrically. The solid central part 29 extends somewhat further into the chamber 27 than into the chamber 28. The restrictor channel 32 opens out in the manner of a funnel 33 in this region of the central part 29. Details will be given hereafter relating to the purpose of this measure.

The entire inside of the chambers 27,28 and of the restrictor channel 32 is filled with a liquid 38, for example an oil, whereof the viscosity is adapted to the cross section of the restrictor channel 32 so that the desired braking force results.

The method of operation of the mixer valve illustrated in FIG. 1 can be understood easily, in which case only an alteration to the quantity (not the temperature) of the mixed water flowing out is of interest.

The quantity of mixed water flowing out is adjusted by linear displacement of the movable control disc 15 with respect to the stationary control disc 5, for which purpose the adjusting lever 12 is tilted about the pivot pin 13. In this case, the volumes of the chambers 27,28 of the damping device 26, which are located below the wings 23,24 of the adjusting lever 12 tilting therewith, vary in opposite directions. In this case, liquid 38 is displaced from one chamber 27,28 respectively into the other chamber 28,27 respectively by may of the restrictor channel 32, which involves a braking force opposing the tilting movement of the adjusting lever 12.

This braking force is generally only desirable in the very last closing stage of the mixer valve, in order that the last closure does not take place too quickly, in order to avoid water hammering. For this reason, the damping device 26 is asymmetrical in the manner described.

The damping device 26 is thus installed below the wings 23,24 of the adjusting lever 12 so that the smaller chamber 27 is compressed when the mixer valve is closed. First of all, as shown in the drawing, the funnel 33 of the restrictor channel 32 is still wide open. However, as the compression of the chamber continues, the funnel 23 of the restrictor channel 32 also closes progressively, so that its cross section becomes smaller and thus the throttle action becomes greater. Due to a suitable choice of the shape of the funnel 33, of the cross section of the restrictor channel 32 and of the viscosity of the liquid 38 used, any desired braking force/displacement characteristic can be adjusted in practice.

Since the opening point of the restrictor channel 32 into the larger chamber 28 is located in a region which remains virtually undeformed during the actuation of the mixer valve, when the adjusting lever 12 is tilted in the opposite direction, thus at the time of opening of the mixer valve, there is no increase in the braking force at the end of the stroke.

As shown in FIG. 4, the outer surfaces of the damping device 26 acted upon by force during tilting of the adjusting lever 12 are protected by reinforcements 34 to 37.

Figure 2:
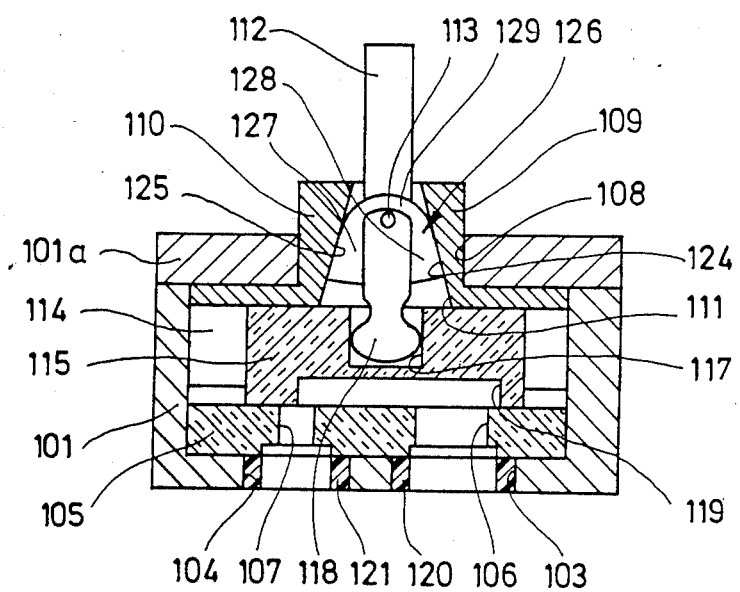
FIG. 2 is an axial section through a second embodiment of a sanitary single-lever mixer.

The embodiment of a mixer valve illustrated in FIG. 2 corresponds largely with that of FIG. 1. Therefore, corresponding components are characterised by the same reference numerals increased by 100. In addition to differences of a purely geometric nature, the housing 101 of the cartridge-type mixer valve illustrated in FIG. 2 comprises a cover 101a, through which the neck 109 of the rotary entrainment member 110 passes. The movable control disc 115 is also constructed as a onepiece ceramic member.

The difference between the two embodiments, which is of interest in the present connection, lies in the arrangement of the damping device 126. In known mixer valves of this construction, the tilting movement of the adjusting lever 112 is limited by two inclined surfaces 124,125 in the central opening 111 of the entrainment member 110. On the other hand, outer shoulders, corresponding to the shoulders 23 and 24 in FIG. 1, are not provided on the adjusting lever 112.

Wedge-shaped areas are again produced between the opposing outer surfaces of the adjusting lever 112 and the inclined surfaces 123,124 of the entrainment member 110, the volumes of which chambers are increased or reduced in opposite directions as the adjusting lever 112 is tilted. The chambers 127,128 of the damping device 126 are located in these wedge-shaped areas, the construction of which damping device corresponds completely to that of FIGS. 3 and 4. The central part 129 of the damping device 126 is laid across the pivot pin 113, so that the damping device 126 cannot slide down on the adjusting lever 112.

The method of operation of the damping device 126 of the embodiment of FIG. 2 moreover corresponds completely to that of the embodiment of FIG. 1.

We claim:

1. A sanitary mixing valve comprising
   (a) a housing,
   (b) inlets to said housing for hot and cold water,
   (c) an outlet from said housing for water,
   (d) a liquid flow control member within said housing which is movable from one position to another to control the flow of water between said inlets and said outlet,
   (e) a pivotally mounted adjusting lever engaged with said flow control member so that the pivoting of said lever through an arc will move said flow control member from a fully open position to a fully closed position,
   (f) a damping device operatively associated with said lever, said damping device comprising
      (1) a pair of compressible fluid chambers positioned adjacent opposite sides of said lever,
      (2) a restrictor fluid channel interconnecting said fluid chambers, whereby, when said lever is pivoted in one direction it will press against one of said compressible fluid chambers to deform said chamber and force the liquid therein to flow in one direction through said restrictor channel, and when said lever is pivoted in the other direction it will press against the other compressible fluid chamber to deform said chamber and force the liquid therein in the other direction through said restrictor channel, thereby inhibiting water hammer of said flow control member in the closing direction.

2. A valve according to claim 1 wherein said damping device has the general overall contour of a double wedge and said lever has attached to it wing like shoulders (23,24) which alternately press against said damping device.

3. Sanitary valve according to claim 1, characterised in that the damping device (26;126) comprises a central part (29), which connects the two chambers (27,28;127,128) to each other and contains a window (30), which receives the adjusting lever (12;112).

4. Sanitary valve according to claim 3, characterised in that the restrictor channel (32) is guided through the central part (29) past the side of the window (30).

5. Sanitary valve according to claim 4, characterised in that a slot (31) is provided on the side of the central part (29) remote from the restrictor channel (32), which slot extends from the window (30) towards the outside of the central part (29).

6. Sanitary valve according to one of claim 3 characterised in that the central part (29) extends assymmetrically in the direction of one chamber (27) in a solid manner into a region which is deformed at the time of tilting of the adjusting lever (12;112).

7. Sanitary valve according to claim 6, characterised in that in the assymmetrically extended region of the central part (29), the restrictor channel (32) has a variable cross section.

8. Sanitary valve according to claim 7, characterised in that in the assymmetrically extended region of the central part (29), the restrictor channel (32) is in the shape of a funnel (33).

9. Sanitary valve according to claim 1 characterised in that the damping device (26:126) is made in one piece from flexible and/or resilient material.

10. Sanitary valve according to claim 1 characterised in that on the outer surfaces, to which force is applied during tilting of the adjusting lever (12;112), the damping device (26;126) comprises reinforcements (34–37).

11. Sanitary valve according to claim 1 characterised in that the chambers (27,28) of the damping device (26) are arranged between two opposing shoulders (23,24) of the adjusting lever (12) and the upper front end (25) of the part (10), in which the adjusting lever (12) is mounted.

12. Sanitary valve according to claim 1, characterised in that the chambers (127,128) of the damping device (126) are arranged between two opposing surfaces of the adjusting lever (112) and two inclined surfaces (124,125) of a bore (111), through which the adjusting lever (112) passes.

* * * * *